March 7, 1950  F. J. WOLFF, JR  2,500,051
OPTICAL PROJECTION SYSTEM FOR INSPECTING
ALIGNMENT OF TYPEWRITER TYPE
Filed June 2, 1947
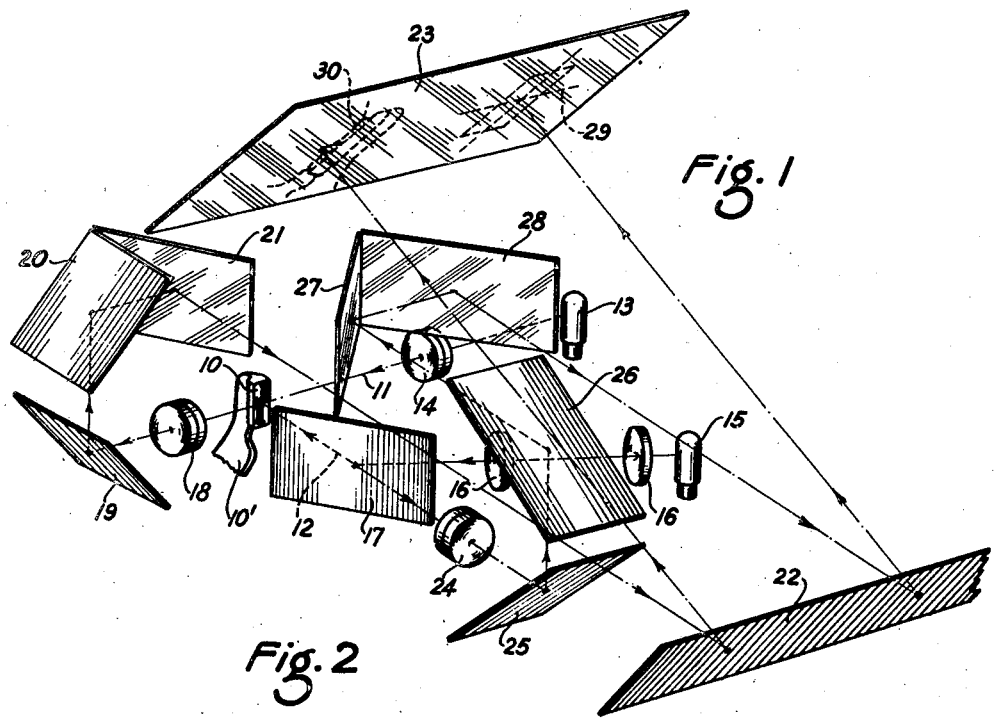
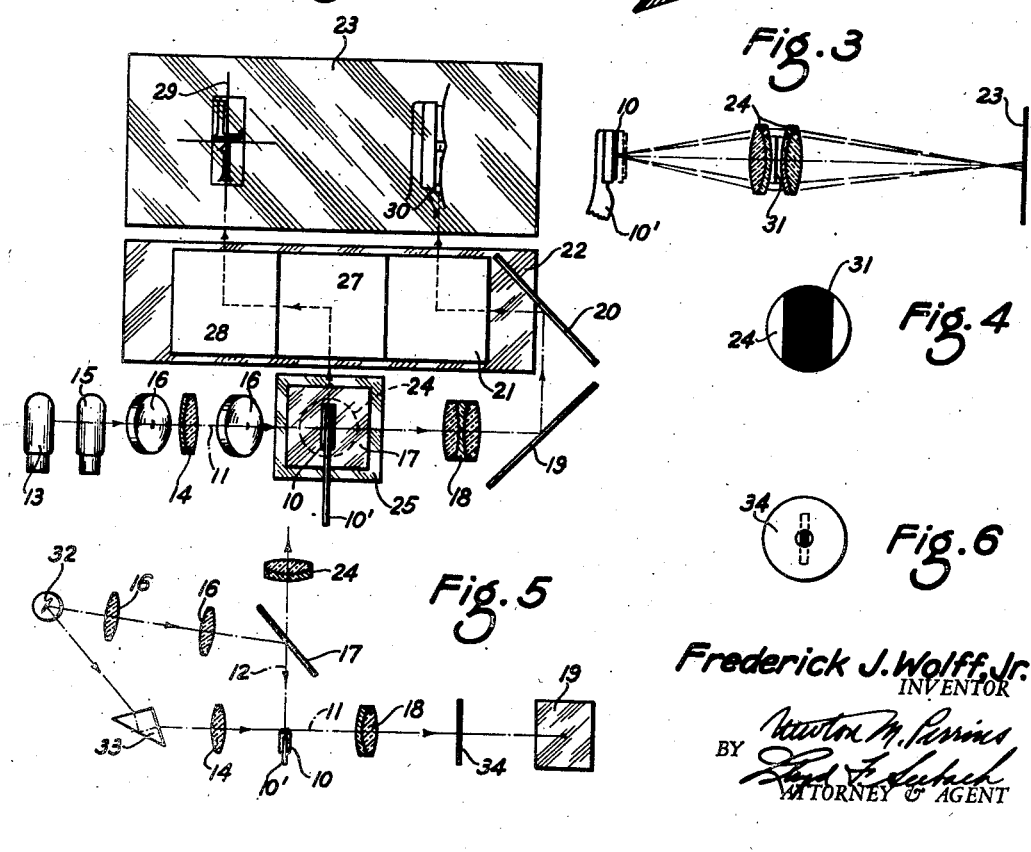
Frederick J. Wolff, Jr.
INVENTOR
BY
ATTORNEY & AGENT Patented Mar. 7, 1950

2,500,051

UNITED STATES PATENT OFFICE 2,500,051

OPTICAL PROJECTION SYSTEM FOR INSPECTING ALIGNMENT OF TYPEWRITER TYPE

Frederick J. Wolff, Jr., Rochester, N. Y., assignor to Eastman Kodak Company, Rochester, N. Y., a corporation of New Jersey Application June 2, 1947, Serial No. 751,690

9 Claims. (Cl. 88—24)

This invention relates to optical projection systems and more particularly to a contour and episcopic projection system for projecting the contour and face images of type onto a screen for inspecting the alignment of the type with respect to reference indicia on the screen.

The primary object of the invention, therefore, is to provide an optical projection system whereby both the contour and face images of the type may be projected simultaneously onto a screen in spaced-apart relationship to observe the alignment of the type with respect to reference indicia on the screen.

Another object of the invention is to provide a means in the optical system for projecting the face image of the type for determining the position of the type with respect to the optical system.

And another object of the invention is to provide a means for eliminating any parallax error in the optical system for projecting the contour image of the type.

A still further object of the invention is to provide an optical system for projecting the contour and face images of the type onto a screen in which a single light source illuminates both the contour and face of the type.

These and other objects of the invention will be apparent to those skilled in the art from the description which follows.

As is well known, the type lever which is actuated from the key board is guided into the typing position by a member adjacent to the platen roll of the typewriter. While this member tends to locate the lever and the type thereon, it is possible that the type may not be properly located on the lever so that uneven spacing between adjacent letters occurs, that the type may strike too high or too low on the platen so that the letters are not typed along a straight line, or that the type does not contact evenly on the platen roll. Skilled operators attempt to correct these faults after the machine has been finally assembled by twisting or bending the type lever. The present invention permits these same corrections to be made by unskilled operators after the keys and type levers have been assembled as a unit so that no adjustments are necessary in the final assembly. By referring to the image of the type on the screen with respect to the reference indicia thereon, the operator can immediately see whether or not the type is in a skewed position on the type lever, whether the position of the type with respect to the platen roll is correct, and whether or not the type is so positioned as to properly strike the platen.

The objects of the invention are embodied in a dual projection system in which the contour and face of the type is illuminated and the images thereof are projected by separate projection lenses and mirrors onto a viewing screen in spaced-apart relationship. The screen is provided with reference indicia for determining the horizontal and vertical alignment of the face of the type and the position of the type contour with respect to the platen. By masking a longitudinally central area of the face projection lens, the position of the type with respect to the normal position can be determined. By inserting a diaphragm at the front focal plane of the contour projection lens the system is made telecentric and any parallax error is eliminated.

Reference is now made to the accompanying drawing wherein similar reference characters designate similar parts and wherein:

Fig. 1 is a diagrammatic perspective view of the preferred embodiment of an optical system for inspecting the alignment of typewriter type.

Fig. 2 is a front elevation of the optical elements shown in Fig. 1 and showing the position of the various mirrors with respect to the type and screen;

Fig. 3 is a detail diagrammatic view of an arrangement for determining the proper position of the type with respect to the system;

Fig. 4 is a detail view of the portion of the lens covered by the mask shown in Fig. 3;

Fig. 5 is a plan view of another embodiment of the invention in which a single light source is used for illuminating both the contour and face of the type and in which a telecentric system is used for the contour projection system; and Fig. 6 is a detail view of the diaphragm used in Fig. 5 to form the telecentric system.

The type 10, which is mounted on the lever 10', as shown in Fig. 1, is illustrative of all of the type used in a typewriter and, as such, is normally positioned, by a means not shown, so that the surface of the type is tangent to the contour optical axis 11 and in line with the face optical axis 12.

The means for illuminating the contour and face of the type comprises the lamp 13 and condenser lens 14 and the lamp 15 and condenser lenses 16. The contour of the type 10 is illuminated by the light from the lamp 13 which is collimated by the lens 14. The face of the type is illuminated by the lamp 15 whose light is focused by the lenses 16 and reflected by the reflecting transmitting mirror 17 onto the face of the type 10.

The optical system for projecting the contour image of the type 10 comprises the projection lens 18, the mirrors 19, 20, and 21, and the common mirror 22. The light from lamp 13 traversing the contour of the type 10 is picked up by the lens 18 which inverts the contour image and projects it via the mirrors 19, 20, 21 and 22 onto the translucent screen 23. The second optical system for projecting the face image of the type comprises the projection lens 24, the mirrors 25, 26, 27 and 28, and the common mirror 22. The light from the lamp 15 is reflected onto the face of the type by the mirror 17 and is reflected by the type through the mirror 17 to the lens 24. The lens 24 inverts the face image and projects it via the mirrors 25, 26, 27, 28 and 22 onto the screen 23 in spaced relation to the contour image.

The reference indicia on the screen 23 comprises a cross line 29 and a double arcuate line 30 which represents the curvature of the platen roll. A double arcuate line is provided so that the upper and lower case letters may be checked for alignment simultaneously. These lines are so positioned on the screen 23 that when the type 10 is in a normal position, the projected image of the contour will be adjacent to the double arcuate line 30 and the face image will be equally split by the horizontal and vertical lines 29. With this arrangement, the operator on bringing successive type into position can tell whether or not they are properly aligned and knows immediately what correction must be made. Also when the lever 10' on which the type is mounted is adjusted for the necessary correction, it can again be brought into position for again checking the alignment with respect to the reference lines 29 and 30.

In order to ensure that the type 10 is in its proper position and tangent to the optical axis 11, the projection lens 24 may be made in two component parts, as shown in Fig. 3, with a mask 31 inserted therebetween. The mask 31 may be of a shape shown in Fig. 4 so that a longitudinally central area of the lens 24 is masked as to divide the image forming beam of light into an upper and lower or left and right bundle of rays. When any point on the type face is out of focus, or displaced from its normal position which is represented by the dotted lines in Fig. 3, the image of that point will fall in front of or behind the image forming surface of the screen 23. In either case, this would result in a doubling of the image on the screen, and thus provides a means of determining the position of the type with respect to the optical system. When the type is tilted so that the type is out of parallel that portion of the type which is out of parallel will also appear as double lines on the screen 23.

In Fig. 5, another embodiment of the invention is shown in which a single light source, such as the ribbon filament lamp 32, illuminates both the contour and face of the type 10. The axis of both condenser systems radiate from the ribbon filament of the lamp 32, a normal to the surface of which makes a small angle with each axis. A prism 33 is utilized to direct the light from the lamp 32 into the condenser lens 16.

In Fig. 5, the contour projection system is made into a telecentric system by placing the diaphragm 34 at the front focus of the lens 18. With this arrangement, any lateral displacement of the type 10 will not produce a difference in image size so that at all times the type 10 appears to be in sharp focus and any parallax due to rays of light which travelled past the type profile at any appreciable angle is eliminated.

Since other modifications of the construction shown are possible, the scope of the invention is not to be limited to the illustrated embodiments but is defined by the appended claims.

What I claim is:

1. An optical system for inspecting alignment of typewriter type comprising means for diascopically illuminating the contour and episcopically illuminating the face of the type, a plane viewing screen, spaced-apart reference indicia on said screen and in the plane thereof for indicating the proper location and orientation of the type by checking thereagainst the projected contour and face images of the type, an image forming lens system for receiving the light traversing the contour of the type and for projecting the image thereof on said screen, a reflecting system for directing the projected contour image of the type onto said screen adjacent to one of said reference indicia, a second image forming lens system for receiving the light reflected from the face of the type and for projecting the image thereof on said screen, and a second reflecting system for directing the projected face image of the type onto said screen in superimposed relationship with the other of said reference indicia.

2. An optical system for inspecting alignment of typewriter type comprising means for diascopically illuminating the contour and episcopically illuminating the face of the type, a viewing screen, reference indicia including a platen reference mark and a horizontal and vertical reference mark in spaced-apart relationship on said screen for indicating the proper location and orientation of the type by checking thereagainst the projected contour and face images of the type, a projection lens system for receiving the light traversing the contour of the type and for projecting the image thereof on said screen, a reflecting system for directing the projected contour image of the type onto said screen adjacent to said platen reference mark, a second projection lens system for receiving the light reflected from the face of the type and for projecting the image thereof on said screen, and a second reflecting system for directing the projected face image of the type onto said screen in superimposed relation to said horizontal and vertical reference marks.

3. An optical system for inspecting alignment of typewriter type comprising means for diascopically illuminating the contour and episcopically illuminating the face of the type, a viewing screen, reference indicia including a platen reference mark and a horizontal and vertical reference mark in spaced-apart relationship on said screen for indicating the proper location and orientation of the type by checking thereagainst the projected contour and face images of the type, an image forming lens system for receiving the light traversing the contour of the type and including a projection lens and a plurality of mirrors for projecting and directing, respectively, the contour image of the type onto said screen adjacent to said platen reference mark, and a second image forming lens system for receiving the light reflected from the face of the type and including a second projection lens and a plurality of mirrors for projecting and directing, respectively, the face image of the type onto said screen in superimposed relation to said horizontal and vertical reference marks, said second plurality of mirrors including one more mirror than said first plurality of mirrors.

4. An optical system for inspecting alignment of typewriter type comprising means for diascopically illuminating the contour and episcopically illuminating the face of the type, a viewing screen, spaced-apart reference indicia on said screen for indicating the proper location and orientation of the type by checking thereagainst the projected contour and face images of the type, an image forming lens system for receiving the light traversing the contour of the type and for projecting the image thereof on said screen, a reflecting system for directing the projected contour image of the type onto said screen adjacent to one of said reference indicia, a second image forming lens system for receiving the light reflected from the face of the type and for projecting the image thereof on said screen, a second reflecting system for directing the projected face image of the type onto said screen in superimposed relationship with the other of said reference indicia, and means cutting off all light reflected from the face of the type toward a longitudinally central area of said second image forming lens system for determining the position of the type with respect to said second image forming lens system.

5. An optical system for inspecting alignment of typewriter type comprising means for diascopically illuminating the contour and episcopically illuminating the face of the type, a viewing screen, reference indicia including a platen reference mark and a horizontal and vertical reference mark in spaced-apart relationship on said screen for indicating the proper location and orientation of the type by checking thereagainst the projected contour and face images of the type, a projection lens system for receiving the light traversing the contour of the type and for projecting the image thereof on said screen, a reflecting system for directing the projected contour image of the type onto said screen adjacent to said platen reference mark, a second projection lens system for receiving the light reflected from the face of the type and for projecting the image thereof on said screen, and a second reflecting system for directing the projected face image of the type onto said screen in superimposed relation to said horizontal and vertical reference marks, and means cutting off all light reflected from the face of the type toward a longitudinally central area of said second projection lens system for determining the position of the type with respect to said projection lens system.

6. An optical system for inspecting alignment of typewriter type comprising means for diascopically illuminating the contour and episcopically illuminating the face of the type, a viewing screen, reference indicia including a platen reference mark and a horizontal and vertical reference mark in spaced-apart relationship on said screen for indicating the proper location and orientation of the type by checking thereagainst the projected contour and face images of the type, an image forming lens system for receiving the light traversing the contour of the type and including a projection lens and a plurality of mirrors for projecting and directing, respectively, the contour image of the type onto said screen adjacent to said platen reference mark, a second image forming lens system for receiving the light reflected from the face of the type and including a second projection lens and plurality of mirrors for projecting and directing, respectively, the face image of the type onto said screen in superimposed relation to said horizontal and vertical reference marks, and a mask cutting off all light reflected from the face of the type toward a longitudinally central area of said second projection lens for determining the position of the type with respect to said second image forming lens system.

7. An optical system for inspecting alignment of typewriter type comprising a light source for simultaneously illuminating both the contour and face of the type, said contour being illuminated diascopically and said face being illuminated episcopically, a viewing screen, reference indicia on said screen for indicating the proper location and orientation of the type by checking thereagainst the projected contour and face images of the type, an image forming lens system for receiving the light traversing the contour of the type and for projecting the image thereof on said screen, a reflecting system for directing the projected contour image of the type onto said screen adjacent to one of said reference indicia, a second image forming lens system for receiving the light reflected from the face of the type and for projecting the image thereof on said screen, a second reflecting system for directing the projected face image of the type onto said screen in superimposed relationship with the other of said reference indicia, a diaphragm in the first-mentioned image forming lens system for eliminating any parallax error, and means cutting off all light reflected from the face of the type toward a longitudinally central area of said second image forming lens system for determining the position of the type with respect to said second image forming lens system.

8. An optical system for inspecting alignment of typewriter type comprising a light source for simultaneously illuminating both the contour and face of the type, said contour being illuminated diascopically and said face being illuminated episcopically, a viewing screen, reference indicia including a platen reference mark and a horizontal and vertical reference mark in spaced-apart relationship on said screen for indicating the proper location and orientation of the type by checking thereagainst the projected contour and face images of the type, a projection lens system for receiving the light traversing the contour of the type and for projecting the image thereof on said screen, a reflecting system for directing the projected contour image of the type onto said screen adjacent to said platen reference mark, a second projection lens system for receiving the light reflected from the face of the type and for projecting the image thereof on said screen, a second reflecting system for directing the projected face image of the type onto said screen in superimposed relation to said horizontal and vertical reference marks, a diaphragm in said first projection lens system for eliminating any parallax error, and means cutting off all light reflected from the face of the type toward a longitudinally central area of said second projection lens system for determining the position of the type with respect to said second projection lens system.

9. An optical system for inspecting alignment of typewriter type comprising a light source for simultaneously illuminating both the contour and face of the type, said contour being illuminated diascopically and said face being illuminated episcopically, a viewing screen, reference indicia including a platen reference mark and a horizontal and vertical reference mark in spaced-apart relationship on said screen for indicating the proper location and orientation of the type and for checking thereagainst the projected contour and face images of the type, an image forming lens system for receiving the light traversing the contour of the type and including a projection lens and a plurality of mirrors for projecting the contour image of the type onto said screen adjacent to said platen reference mark, a second image forming lens system for receiving the light reflected from the face of the type and including a second projection lens and plurality of mirrors for projecting the face image of the type onto said screen in superimposed relation to said horizontal and vertical reference marks, said second plurality of mirrors including one more mirror than said first plurality of mirrors, a diaphragm at the front focal plane of said first-mentioned projection lens for eliminating any parallax error, and a mask between the elements of said second projection lens cutting off all the light reflected from the face of the type toward a longitudinally central area of said second projection lens for determining the position of the type with respect to said second image forming lens system.

FREDERICK J. WOLFF, Jr.

REFERENCES CITED

The following references are of record in the file of this patent:

UNITED STATES PATENTS

| Number | Name | Date |
|---|---|---|
| 1,789,009 | Luce | Jan. 13, 1931 |
| 2,074,991 | Salcedo | Mar. 23, 1937 |
| 2,155,248 | Adams et al. | Apr. 18, 1939 |
| 2,179,799 | Phillips | Nov. 14, 1939 |
| 2,192,529 | Thomas et al. | Mar. 5, 1940 |
| 2,221,154 | Soper | Nov. 12, 1940 |
| 2,261,772 | Longfellow | Nov. 4, 1941 |
| 2,299,024 | Maurer | Oct. 13, 1942 |
| 2,335,127 | Ling | Nov. 23, 1943 |
| 2,365,613 | Wibmer et al. | Dec. 19, 1944 |
| 2,398,139 | Freeman | Apr. 9, 1946 |